United States Patent
Singh (10) Patent No.: US 8,983,045 B1
(45) Date of Patent: *Mar. 17, 2015

(54) MANAGING VENDOR CREDITS DURING LOAD BALANCING

(71) Applicant: Sprint Communications Company L.P., Overland Park, KS (US)

(72) Inventor: Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,012

(22) Filed: Aug. 14, 2013

Related U.S. Application Data (63) Continuation of application No. 13/334,501, filed on Dec. 22, 2011, now Pat. No. 8,553,861.

(51) Int. Cl.
| | |
|---|---|
| *H04M 15/00* | (2006.01) |
| *H04M 7/00* | (2006.01) |
| *H04W 36/00* | (2009.01) |
| *H04L 12/803* | (2013.01) |

(52) U.S. Cl.
CPC .................................. *H04L 47/125* (2013.01)
USPC .............. 379/112.1; 379/112.04; 379/221.02; 455/436

(58) Field of Classification Search
USPC ................. 379/112.03, 112.04, 112.1, 15.01, 379/221.03; 370/229
See application file for complete search history.

(56) References Cited

U.S. PATENT DOCUMENTS

| | | | |
|---|---|---|---|
| 6,266,531 B1 | 7/2001 | Zadeh et al. | |
| 6,366,780 B1 | 4/2002 | Obhan | |
| 6,611,506 B1 | 8/2003 | Huang et al. | |
| 8,228,791 B2 * | 7/2012 | Bugenhagen et al. | 370/230 |
| 8,553,861 B1 * | 10/2013 | Singh | 379/112.1 |
| 2006/0142021 A1 | 6/2006 | Mueckenheim et al. | |
| 2008/0049675 A1 | 2/2008 | Burgan et al. | |
| 2009/0163223 A1 | 6/2009 | Casey | |
| 2010/0093281 A1 | 4/2010 | Khanka et al. | |
| 2010/0222071 A1 | 9/2010 | Tafreshi et al. | |
| 2010/0232390 A1 | 9/2010 | Varma | |
| 2010/0246534 A1 | 9/2010 | Vargantwar | |
| 2010/0248738 A1 | 9/2010 | Chayat | |

(Continued)

OTHER PUBLICATIONS

Load balancing (computing). Date Retrieved—Nov. 14, 2011. http://en.wikipedia.org/wiki/load_balancing_(computing).

(Continued)

*Primary Examiner* — Quoc D Tran (57) ABSTRACT

A computer-implemented method of using vendor credits to achieve load balancing in a communications network is described. Network traffic operating under a first carrier of the communications network is monitored. Initial load balancing triggers are set, by which network traffic of the first carrier is offloaded to a second carrier. It is determined whether the initial load balancing triggers have been met. It is also determined whether a vendor credit of the first carrier is available when the initial load balancing triggers have been met. One or more devices of the first carrier are offloaded to the second carrier when a vendor credit of the first carrier is available.

18 Claims, 6 Drawing Sheets

(56) References Cited

U.S. PATENT DOCUMENTS

| | | |
|---|---|---|
| 2011/0158089 A1 | 6/2011 | Sambhwani |
| 2011/0199905 A1 | 8/2011 | Pinheiro |
| 2011/0225298 A1 | 9/2011 | Brown |
| 2011/0243106 A1 | 10/2011 | Hsu |
| 2011/0252477 A1 | 10/2011 | Sridhar et al. |
| 2011/0255406 A1 | 10/2011 | Wu |
| 2011/0256880 A1 | 10/2011 | Golaup |
| 2011/0261695 A1 | 10/2011 | Zhao |
| 2011/0267978 A1 | 11/2011 | Etemad |
| 2012/0236712 A1 | 9/2012 | Park et al. |

OTHER PUBLICATIONS

Pre Interview First Office Action:, mailed Feb. 25, 2013, in U.S. Appl. No. 12/334,501.

Preinterview Interview First Office Action, mailed Aug. 14, 2013, in U.S. Appl. No. 13/334,93.

First Action Interview Office Action mailed Oct. 8, 2013 in U.S. Appl. No. 13/334,493.

* cited by examiner

MANAGING VENDOR CREDITS DURING LOAD BALANCING

PRIORITY

This application is a continuation of U.S. patent application Ser. No. 13/334,501, filed Dec. 22, 2011, which is hereby incorporated by reference in its entirety.

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter, nor is it intended to be used as an aid in isolation to determine the scope of the claimed subject matter.

In an embodiment of the invention, computer-readable instructions are embodied on one or more computer-readable storage media for a method of using vendor credits to achieve load balancing in a communications network is described. Incoming network traffic operating under a first carrier of the communications network is monitored. Initial load balancing triggers are established, by which network traffic of the first carrier is offloaded to a second carrier. It is determined whether the initial load balancing triggers have been met. It is also determined whether a vendor credit of the first carrier is available when the initial load balancing triggers have been met. One or more devices of the first carrier are offloaded to the second carrier when a vendor credit of the first carrier is available.

In another embodiment of the invention, a computer-implemented method of load balancing between multiple carriers in a network is described. Incoming network traffic that operates under a first carrier of the network is received. Initial load balancing triggers are established to move the network traffic from the first carrier to a second carrier. It is determined whether the initial load balancing triggers have been met. It is also determined whether a vendor credit from the second carrier to the first carrier is available when the initial load balancing triggers have been met. One or more devices are moved from the first carrier to the second carrier when the vendor credit from the second carrier to the first carrier is available.

In still another embodiment, a computer-implemented method of load balancing between multiple carriers in a telecommunications network is described. Incoming network traffic that operates under a first carrier of a telecommunications network is received. One or more user devices that operate at a first bandwidth level of the first carrier that are capable of operating at a second bandwidth level of a second carrier are identified. It is determined whether one or more load balancing triggers have been met pertaining to the received incoming network traffic operating under the first carrier. It is also determined whether a vendor credit is available from the second carrier to the first carrier. Some of the identified one or more user devices are moved from the first carrier to the second carrier in order to use the vendor credit from the second carrier to the first carrier.

BRIEF DESCRIPTION OF THE SEVERAL VIEWS OF THE DRAWINGS

Illustrative embodiments of the invention are described in detail below, with reference to the attached drawing figures, which are incorporated by reference herein, and wherein.

DETAILED DESCRIPTION

Embodiments of the invention provide methods, systems, and computer-readable media with computer-readable instructions embodied thereon for using vendor credits in a network load balancing partnership. The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Throughout the description of different embodiments of the invention, several acronyms and shorthand notations are used to aid the understanding of certain concepts pertaining to the associated systems, methods and computer-readable media. These acronyms and shorthand notations are intended to help provide an easy methodology for communicating the ideas expressed herein and are not meant to limit the scope of any embodiment of the invention.

Embodiments of the invention include, among other things, a method, system, or set of instructions embodied on one or more computer-readable media. Computer-readable media include both volatile and nonvolatile media, removable and non-removable media, and media readable by a database and various other network devices. Computer-readable media comprise computer storage media. By way of example, and not limitation, computer-readable media comprise media implemented in any method or technology for storing information. Examples of stored information include computer-useable instructions, data structures, program modules, and other data representations. Media examples include, but are not limited to, information-delivery media, Random Access Memory (RAM), Read Only Memory (ROM), Electronically Erasable Programmable Read Only Memory (EEPROM), flash memory or other memory technology, Compact Disc (CD) ROM, digital versatile discs (DVD), holographic media or other optical disc storage, magnetic cassettes, magnetic tape, magnetic disk storage, and other magnetic storage devices. These technologies can store data momentarily, temporarily, or permanently. The computer readable media include cooperating or interconnected computer readable media, which exist exclusively on a processing system or distributed among multiple interconnected processing systems that may be local to, or remote from, the processing system. Combinations of any of the above should also be included within the scope of computer-readable media.

An operating environment for mobile devices and interfaces used for embodiments of the invention include a processing system with one or more high speed central processing unit(s) ("CPU"), or other types of processors, a memory system, and a database system. The embodiments of the invention are described below with reference to acts and symbolic representations of operations or instructions that are performed by the processing system, unless indicated otherwise. Such acts and operations or instructions are referred to as being "computer executed," "CPU executed," or "processor executed." The memory locations where data bits are maintained are physical locations that have particular electrical, magnetic, optical, or organic properties corresponding to the data bits.

Figure 1:
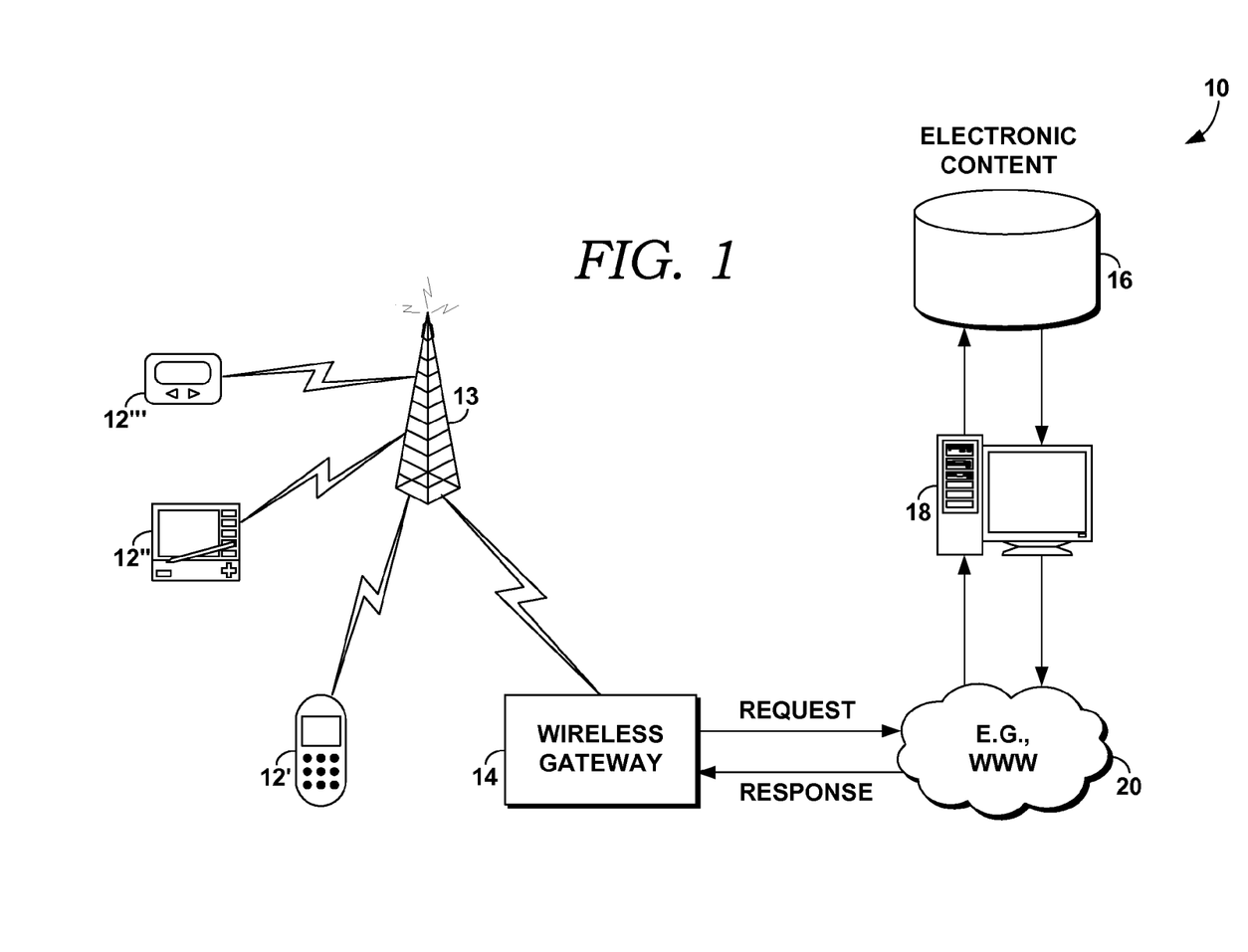
FIG. 1 is a block diagram of a telecommunications system according to embodiments of the invention.

An overview of a telecommunications system will be described, with reference to a block diagram of FIG. 1, which illustrates an exemplary wireless network system 10. Wireless network system 10 includes mobile devices 12, a wireless gateway 14, a database 16 including electronic content, a database server 18, and an information network 20, such as the World Wide Web (WWW). However, none of the embodiments of the invention are limited to these components and more, fewer or other components can also be used in wireless network system 10. For simplicity, only one wireless gateway 14, database 16, and database server 18 are illustrated in FIG. 1. However, embodiments of the invention also contemplate multiple gateways, databases, and database servers.

The mobile devices 12 include a mobile phone 12', a personal digital assistant ("PDA") 12", a one and two-way pager 12''' and other types of mobile devices (not illustrated). Mobile devices 12 may include devices that typically connect using a wireless communications medium such as radio frequency (RF) devices, infrared (IR) devices, or integrated devices combining one or more of the preceding devices. A mobile device, as described herein, refers to any type of wireless phone, handheld device, personal digital assistant (PDA), BlackBerry®, smartphone, digital camera, or other mobile devices (aside from a laptop) capable of communicating wirelessly. One skilled in the art will appreciate that mobile devices will also include a processor and computer-storage media to perform various functions. In embodiments, computing devices can also refer to devices that are running applications of which images are captured by the camera in a mobile device.

The mobile devices 12 encompass a general computing system used in accordance with embodiments of the invention. A mobile device computing system includes a bus that directly or indirectly couples a memory region, one or more processors, one or more presentation components, input/output ports, input/output components, and a power supply. The bus may be representative of one or more busses, such as an address bus, data bus, or any combination thereof.

The information network 20 is configured to allow network connections between a client device and other networked devices, such as database server 18. The information network 20 may be configured to employ a means of communicating information from one computing device to another, such as through a universal serial bus (USB) port, Ethernet link, or any combination thereof. In one embodiment, the information network 20 may be the Internet, or may include local area networks (LANs), wide area networks (WANs), or direct connections.

Information network 20 may further employ a plurality of wireless access technologies including, but not limited to, $2^{nd}$ (2G), $3^{rd}$ (3G), and $4^{th}$ (4G) generation radio access for cellular systems, Wireless-LAN, or Wireless Router (WR) mesh. Access technologies such as 2G, 3G, 4G, and future access networks may enable wide area coverage for network devices with various degrees of mobility. For example, the information network 20 may enable a wireless network connection over one of the aforementioned access technologies using a protocol for wireless data transfer such as Global System for Mobile communication (GSM), General Packet Radio Services (GPRS), Enhanced Data GSM Environment (EDGE), and Wideband Code Division Multiple Access (WCDMA).

The wireless gateways 14 provide a code division multiple access ("CDMA"), Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Radio Frequency ("RF"), paging and wireless messaging, Packet Cellular Network ("PCN"), Global System for Mobile Communications, "GSMC"), Worldwide Interoperability for Microwave Access (WiMAX), Generic Packet Radio Services ("GPRS"), Personal Communications Services ("PCS"), Cellular Digital Packet Data ("CDPD"), Wireless Application Protocol ("WAP"), Digital Audio Broadcasting ("DAB"), Bluetooth, 802.11a, 802.11b, or other types of wireless interfaces for the mobile devices 12. The WAP includes several protocols and standards designed to provide mobile devices with access to electronic content, and it was developed as an alternative to other markup languages and protocols developed for the World Wide Web. One component of the WAP is a Wireless Markup Language ("WML"), which includes markup tags, and provides control over formatting and layout of electronic content. The WML is often more appropriate to use for mobile devices such as wireless phones than other markup languages such as Hyper Text Markup Language ("HTML"), etc.

The wireless gateway 14 includes virtually any device that forwards network traffic. Such devices include, for example, routers, proxies, firewalls, access points, link load balancers, devices that perform network address translation, or any combination of the preceding devices. The wireless gateway 14 may recognize packets that are part of a particular communication protocol or are the same network connection or application session. The wireless gateway 14 may perform special processing on such packets including granting access to a client machine, logging or not logging an event, or network address and port translation.

The database 16 includes electronic content such as text, hypertext, graphical data or references to graphical data images, audio, video, and other content. The electronic content may be stored as a web page or WAP page on a database server, such as server 18. The server 18 can download electronic content from the database 16 to the mobile device 12.

Server 18 includes any computing device capable of establishing or maintaining a network connection with a client device. In one embodiment, server 18 is configured to operate as a web server. The server 18 can also operate as a messaging server, File Transfer Protocol (FTP) server, chat server, media server, or online gaming server. In addition, server 18 can be a single component in a larger online application. Devices that can operate as server 18 include, but are not limited to, personal computers, multiprocessor systems, microprocessor-based or programmable consumer electronics, network personal computers, or integrated devices combining one or more of the preceding devices.

A hypertext document includes markup codes called "tags." The structure of hypertext documents is defined by document markup languages such as Hand Held Device Markup Language ("HDML"), HTML, compact HTML ("cHTML"), eXtensible Markup Language ("XML"), WML and voice eXtensible Markup Language (VoxML"), and others. Markup languages also allow references to additional electronic content other than text, including graphics, animation, audio, video, applets, and other electronic data.

Electronic content is displayed on a mobile device 12 with a software application, such as but not limited to a "browser." A browser on a mobile device 12 may be a subset of a larger browser, or a micro-browser. A micro-browser may not be capable of fully displaying content requested from the database server 18. A micro-browser reads electronic content and renders the electronic content into a presentation, such as but not limited to text, graphics, animation, audio, video, etc., for display on the mobile device 12.

The mobile devices 12 illustrated in FIG. 1 interact with wireless network system 10 based on standards proposed by the Institute of Electrical and Electronic Engineers ("IEEE"), International Telecommunications Union-Telecommunication Standardization Sector ("ITU"), Internet Engineering Task Force ("IETF"), Wireless Application Protocol ("WAP") Forum, Java Community, the American National Standard Institute ("ANSI"), or other proprietary standards.

Each mobile device 12 is coupled to a base station 13 via a wireless link, as illustrated in FIG. 1. Each mobile device 12 is capable of communicating with the base station 13 using multiple frequency bands. A frequency bandwidth is a selected frequency range in the electromagnetic spectrum. Selected frequency bands are designated for use with wireless communications such as wireless telephony. The mobile devices 12 may use frequency bands, frames, air-interface allocation units (slots), etc. specified by the WiMAX specifications. The base station 13 may be any wireless system that provides the air interface to mobile devices 12. Examples of base stations that may be utilized include, but are not limited to base transceiver stations (BTS), radio base stations (RBS), Node B, enhanced Node B (eNode B), as well as others. Base station 13 may include transceivers, power amplifiers, combiners, duplexers, and antennas. Base station 13 may also include other components, such as a control function or control computer.

A first mobile device 12, such as 12', may be using a first frequency band. A second mobile device 12, such as 12", may be using a second frequency band. The first mobile device 12' may be associated with a first air-interface utilization, while the second mobile device 12" may be associated with a second air-interface utilization. An air interface specifies the frequency band which a mobile device operates at to ensure a compatible connection between the mobile device and the base station 13. An air interface utilization may correspond to an uplink utilization or a downlink utilization.

The first mobile device 12' may request an air-interface resource from base station 13. First mobile device 12' may be requesting the air-interface resource as a new mobile device becoming active, as an idle user becoming active, as part of an initial registration procedure, or due to a handoff from another base station (not shown). Base station 13 may direct the request from the first mobile device 12' to a carrier spectrum with the least air-interface utilization in an attempt to achieve load balancing.

When the first air-interface utilization satisfies one or more criteria, base station 13 may transfer the first mobile device 12' to a second carrier. The criteria used to determine whether a mobile device is transferred to another carrier include, but are not limited to a total number of users, a percentage of users for a particular carrier, or a required quality of service. For example, when the first air-interface utilization exceeds a threshold, then base station 13 may redirect the first mobile device 12' to use the second carrier. Other mobile devices 12 that satisfy one or more criteria would also be transferred to the second channel. In an embodiment, a number of criteria-qualifying mobile devices would be transferred until the communications traffic reached a level below a threshold level.

Wireless mobile communication technology uses various standards and protocols to transmit data between the base station 13 and a mobile device 12. The base station 13 is a combination of one or more enhanced Node Bs (eNode Bs) and Radio Network Controllers (RNC) in a Universal Terrestrial Radio Access Network (UTRAN), which communicates with the mobile devices 12. An eNode B can have a plurality of different carriers. As an example, each carrier can have a specific bandwidth and center frequency. In embodiments of the invention, a first spectrum is under the authority of a first carrier and a second spectrum is under the authority of a second carrier, wherein the first carrier and the second carrier differ. More than two carriers, or n carriers are also contemplated within embodiments of the invention, where n is a positive integer.

A base transceiver station (BTS) of a wireless communications network comprises one or more radio access networks (RANs). An eNode B is a specific type of RAN. In embodiments of the invention, each RAN or eNode B contains a plurality of different carriers, wherein each carrier has a specific bandwidth.

Load balancing is a computer networking methodology to distribute workload across multiple computers, network links, or other resources, to achieve optimal resource utilization. Load balancing helps maximize throughput, minimize response time, and avoid overload. Using load balancing in communications allows multiple links to be in use all the time. A device or program monitors the availability of all links and selects the path for sending packets. Use of multiple links simultaneously increases the available bandwidth. Telecommunications companies may have multiple routes through their networks or to external networks. Load balancing shifts traffic from one path to another to avoid network congestion on any particular link, and can minimize the cost of transit across external networks.

Load balancing can be implemented through network sharing between multiple carriers through a partnership of two or more carriers. When a carrier has reached a load threshold, the additional traffic can be directed or offloaded onto a partner carrier. When a carrier, such as Carrier A offloads some of its network traffic to a partner carrier, such as Carrier B, a vendor credit is issued to Carrier B for the use of its network bandwidth. The vendor credit can be utilized later by Carrier B when Carrier B needs to move some of its network traffic to Carrier A. A partnership agreement between Carrier A and Carrier B would specify the level of Carrier B bandwidth that Carrier A is entitled to use, and vice versa. If some of the network bandwidth has not been utilized under the agreement, then a vendor credit would result for the unused portion of network bandwidth. However, the vendor credit expires after a set amount of time. Therefore, the vendor credit may be lost if there is no need to offload network traffic before the expiration date of the vendor credit. On the other hand, if network traffic is offloaded prematurely in an attempt to utilize the vendor credit before its expiration date, then the first carrier may need to pay a roaming charge to the second carrier if no first carrier vendor credits are available when needed. In an embodiment of the invention, network traffic can be adjusted between carriers based on dynamic load balancing triggers, such as vendor credits within a network sharing system.

Figure 2:
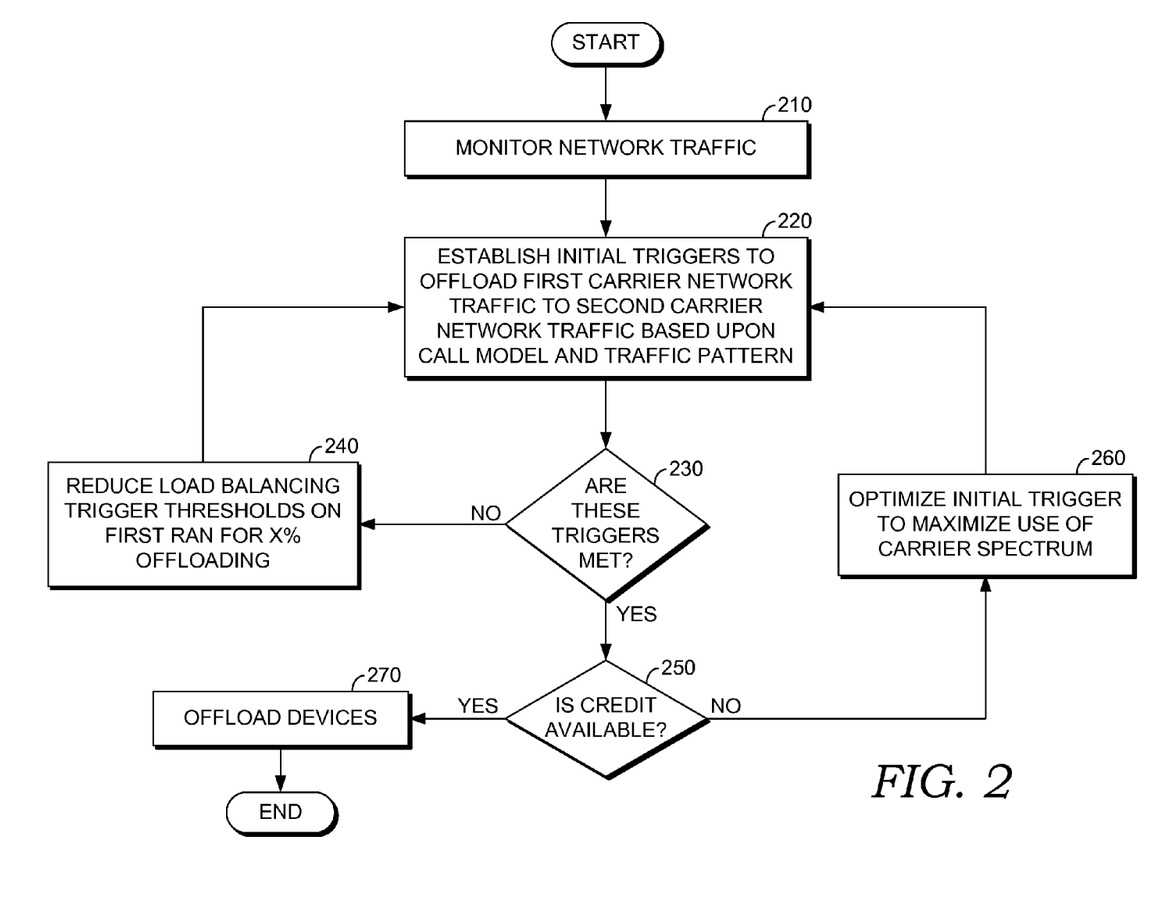
FIG. 2 is a flowchart that illustrates a computer-implemented method of using vendor credits to achieve load balancing in a network system according to embodiments of the invention.

FIG. 2 is a flowchart that illustrates a computer-implemented method of using vendor credits to achieve load balancing in a network system. In step 210, the incoming network traffic operating under a first carrier of the network is monitored. Initial load balancing triggers are established by the BTS in step 220, which govern the offloading of network traffic from the first carrier to a second carrier. The initial load balancing triggers may be based upon the traffic pattern of the first carrier, such as traffic congestion or previous traffic patterns. The initial load balancing triggers may also be based upon the call model of the one or more devices operating under the first carrier, such as the bandwidth capability of each device.

In step 230, it is determined whether the initial load balancing triggers have been met. The initial load balancing triggers may comprise one or more of the amount of usage, the number of users, or a quality of service criterion of network traffic. If the initial load balancing triggers have not been met, then a threshold of one or more of the load balancing triggers is reduced by a certain percentage, in step 240. For example, if no vendor credits were available to move network traffic to a partner carrier, then the load balancing triggers would be reduced, such that offloading would not occur until later when a higher threshold level had been achieved. Vendor credits may also be available later when the reduced threshold level is achieved. In an embodiment, this reduction in threshold is controlled by a Base Transceiver Station (BTS) in conjunction with a tower of a network, such as a telecommunications network. In another embodiment, this reduction in threshold is controlled by a Radio Access Network (RAN) of a telecommunications network. In still another embodiment, an enhanced Node B (eNode B) controls the reduction in threshold levels. After reducing the threshold level for offloading in step 240, the process returns to step 220 to establish new initial triggers.

A partnership agreement can be formed between two or more network carriers. The agreement may allow a first carrier to use an allotted amount or a percentage amount of bandwidth of a second carrier, and vice versa. In embodiments of the invention, an agreement is made to share network bandwidth between multiple carriers, such as an agreement between n carriers, where n is a positive integer. If the first carrier does not use all of its allotted bandwidth of the second or $n^{th}$ carrier according to the partnership agreement, then a vendor credit results with that second or $n^{th}$ carrier. In order for the first carrier to avoid losing the vendor credit, it would be prudent to use any available vendor credits within a relatively short period of time. In embodiments of the invention, the RAN monitors the availability of vendor credits, so that they may be used before they expire. In other embodiments of the invention, an eNode B monitors the availability of vendor credits. The availability of vendor credits is used, in part, to obtain load balancing between the carriers within a partnership. When excess traffic needs to be offloaded from the first carrier to another carrier, then any available vendor credits for using the other carrier will be used first. Monitoring and using vendor credits to obtain load balancing also avoids using the vendor credits prematurely before they are needed. If vendor credits are used prematurely before offloading is necessary, then the first carrier may need to pay the second or $n^{th}$ carrier roaming charges when it becomes necessary to offload excess traffic to that second or $n^{th}$ carrier at a later time. Vendor credits can also be used in combination with other factors to obtain load balancing between carriers.

With continued reference to FIG. 2, it is determined whether a vendor credit is available in step 250. If there is no vendor credit available, then the initial load balancing triggers are optimized in order to maximize use of the first carrier bandwidth in step 260. One example for maximizing use of carrier spectrum is to utilize any vendor credits from a third or fourth partner carrier, if more than two partner carriers exist in the partnership agreement. Another example is to adjust the trigger levels so that a more positive vendor credit arrangement may be developed. The process returns to step 220, where new initial triggers are established. If vendor credits are available in step 250, then a corresponding number of devices from the first carrier are offloaded to the second or $n^{th}$ carrier, according to the available vendor credit, in step 270. One or more computer-readable media, that when executed by a computing device, perform the above-described method of using vendor credits to achieve load balancing in a network system is also contemplated by embodiments of the invention.

Figure 3:
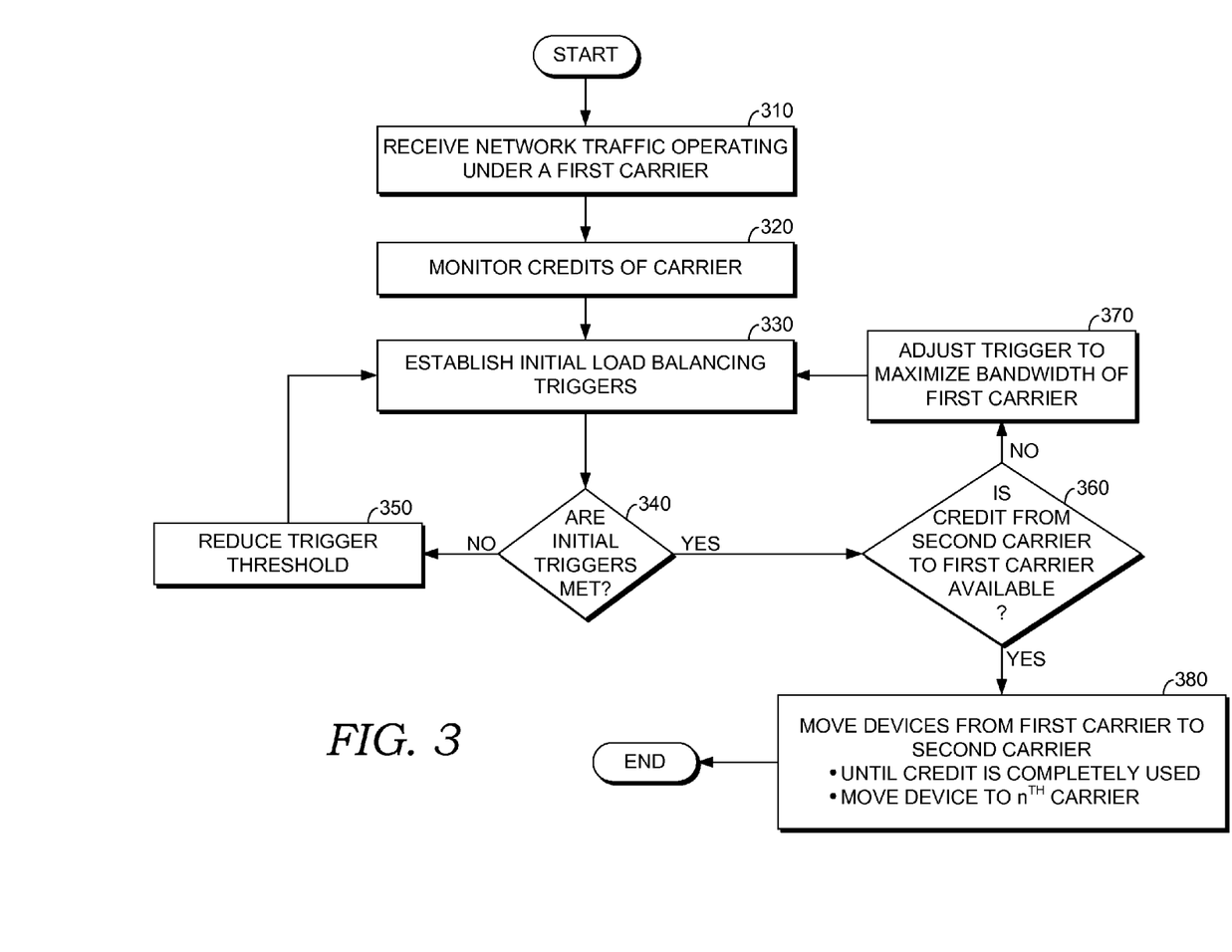
FIG. 3 is a flowchart which illustrates a computer-implemented method of load balancing between multiple carriers in a network according to embodiments of the invention.

FIG. 3 is a flowchart which illustrates a computer-implemented method of load balancing between multiple carriers in a network, such as a telecommunications network. Incoming network traffic that operates under a first carrier of the network is received in step 310. Vendor credits that become available and vendor credits that are utilized by the first carrier are monitored in step 320. In embodiments of the invention, vendor credits are monitored by a base transceiver station (BTS) of a network, such as a telecommunications network. In other embodiments of the invention, the vendor credits are monitored by an enhanced Node B (eNode B) of a telecommunications network.

A network partnership agreement is formed between two or more communications carriers for sharing network bandwidth. Initial load balancing triggers, by which network traffic is moved from a first carrier to a second carrier, according to terms of the partnership agreement, are established in step 330. Initial load balancing triggers may include one or more of the amount of bandwidth usage, the number of network users, or the quality of service that is desired or contracted. In step 340, it is determined whether the initial load balancing triggers are met. If the initial load balancing triggers have not been met, then a threshold level of the initial load balancing triggers is reduced in step 350. The process returns to step 330, where new initial load balancing triggers are established.

If the initial load balancing triggers have been met in step 340, then it is determined whether any vendor credit from the second carrier to the first carrier is available in step 360. If no vendor credits are available, then the initial load balancing triggers are adjusted to maximize use of the bandwidth of the first carrier in step 370. The process returns to step 330, where new initial load balancing triggers are established.

If credits are available in step 360, then a corresponding number of devices are moved from the first carrier to the second carrier in step 380. In an embodiment of the invention, devices are moved from the first carrier to the second carrier until an equitable amount of the first carrier vendor credit is completely used. In another embodiment of the invention, vendor credits from other carriers are used, instead of the second carrier, or in addition to the second carrier. For example, devices from the first carrier are moved to an $n^{th}$ carrier when a vendor credit for the $n^{th}$ carrier exists and when those devices are capable of operating within the bandwidth of the $n^{th}$ carrier. The devices from the first carrier are moved to the $n^{th}$ carrier until the credit from the $n^{th}$ carrier is completely used, in an embodiment of the invention. One or more computer-readable media, that when executed by a computing device, perform the above-described method of load balancing between multiple carriers in a network is also contemplated by embodiments of the invention.

Figure 4:
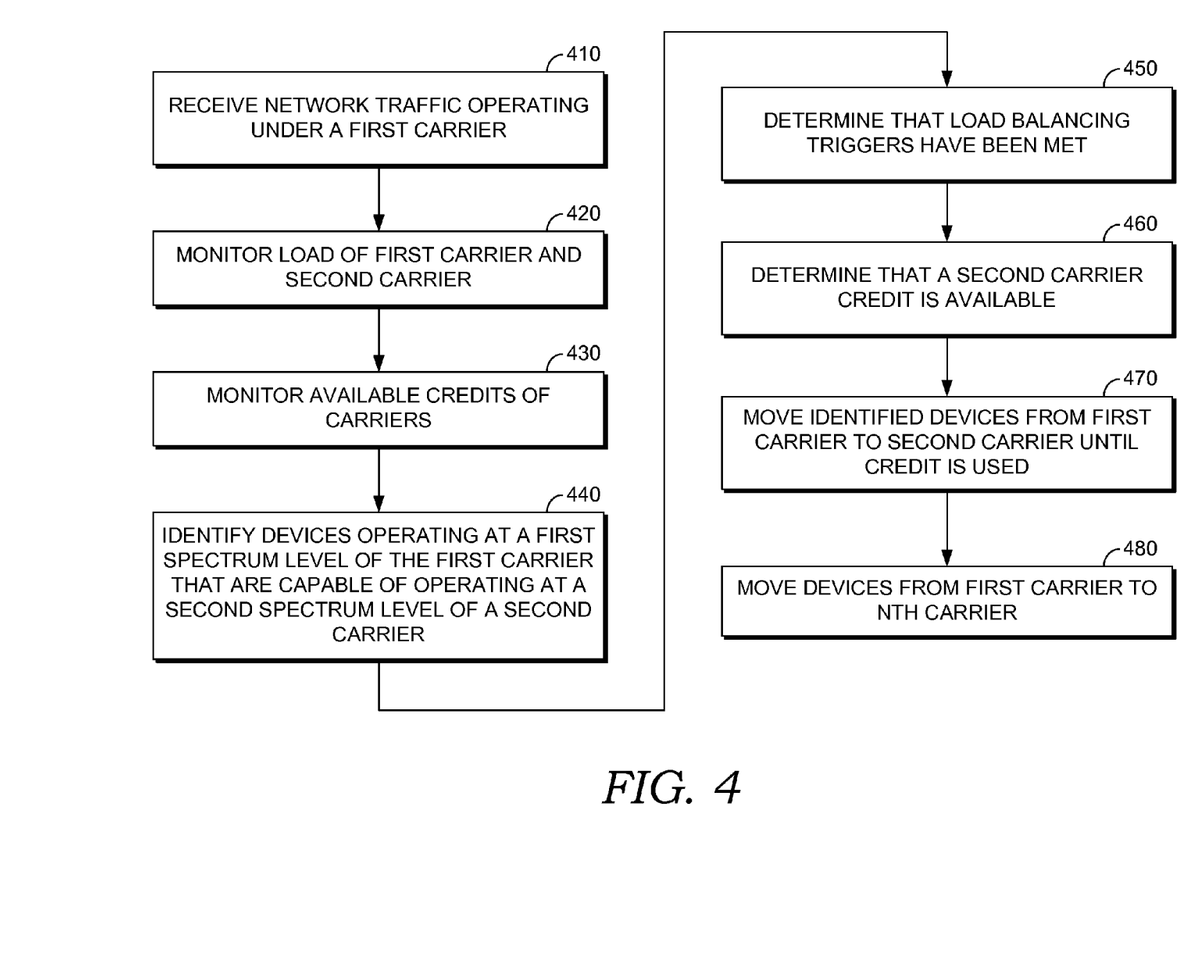
FIG. 4 is a flow diagram of a method of load balancing between multiple carriers in a telecommunications network according to embodiments of the invention.

FIG. 4 illustrates a flow diagram of a method of load balancing between multiple partner carriers in a telecommunications network. Incoming network traffic which operates under a first carrier of the telecommunications network is received in step 410. A partnership agreement may be formed between two or more carriers, such as Carrier A and Carrier B. A load of the first carrier and the second carrier are monitored in step 420. The loads of the first carrier and the second carrier are monitored by a base transceiver station (BTS) component, in an embodiment of the invention. When a carrier, such as Carrier A offloads some of its network traffic to a partner carrier, such as Carrier B, a vendor credit is issued to Carrier B for the use of its network bandwidth. The vendor credit can be utilized later by Carrier B when Carrier B needs to move some of its network traffic to Carrier A. The agreement would specify the level of Carrier B bandwidth usage that Carrier A is entitled to use, and vice versa. If some of the network bandwidth has not been utilized under the agreement, then a vendor credit would result for the unused portion of network bandwidth. Credits of the first and second carriers are monitored in step 430. In a partnership agreement between two carriers, credits from the second carrier to the first carrier would be monitored, and credits from the first carrier to the second carrier would also be monitored.

Devices which operate at a first bandwidth level of the first carrier that are also capable of operating at a second bandwidth level of a second carrier are identified in step 440. In step 450, it is determined by the BTS that one or more load balancing triggers have been met, which pertain to the received network traffic operating under the first carrier. In an embodiment of the invention, the monitoring is implemented by a RAN. In another embodiment of the invention, the monitoring is implemented by an eNode B. Step 460 determines that a vendor credit is available from the second carrier to the first carrier. Those devices identified in step 440 are moved from the first carrier to the second carrier until the vendor credit is completely used in step 470. In step 480, some of the previously identified user devices are moved from the first carrier to an $n^{th}$ carrier when a vendor credit is available from the $n^{th}$ carrier to the first carrier. Those devices moved to the $n^{th}$ carrier are capable of operating at the $n^{th}$ carrier bandwidth level. Step 480 may be implemented in addition to step 470, or instead of step 470, according to embodiments of the invention. One or more computer-readable media, that when executed by a computing device, perform the above-described method of load balancing between multiple carriers in a telecommunications network is also contemplated by embodiments of the invention.

Figure 5A:
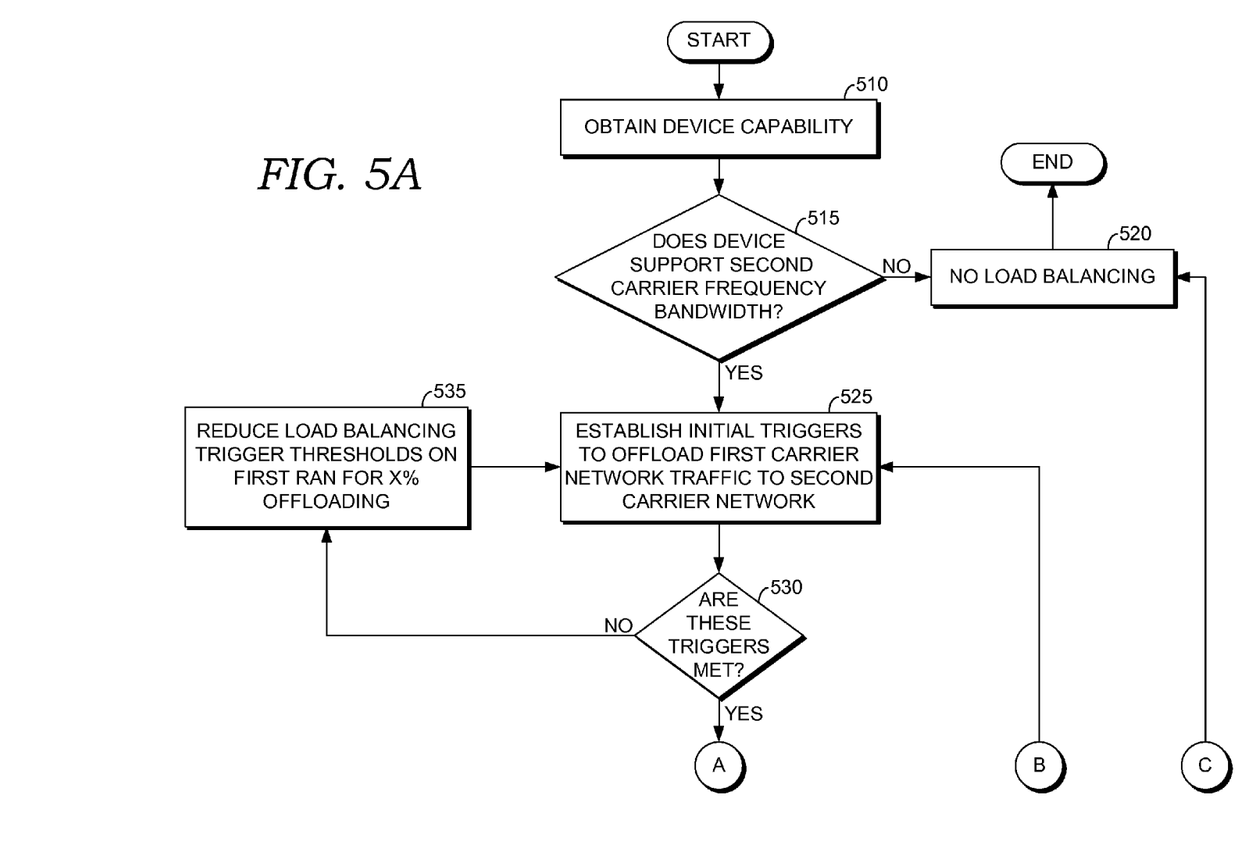
FIGS. 5A and 5B are flowcharts illustrating a computer-implemented method of load balancing between multiple carriers in a communications network using multiple factors according to embodiments of the invention.
Figure 5B:
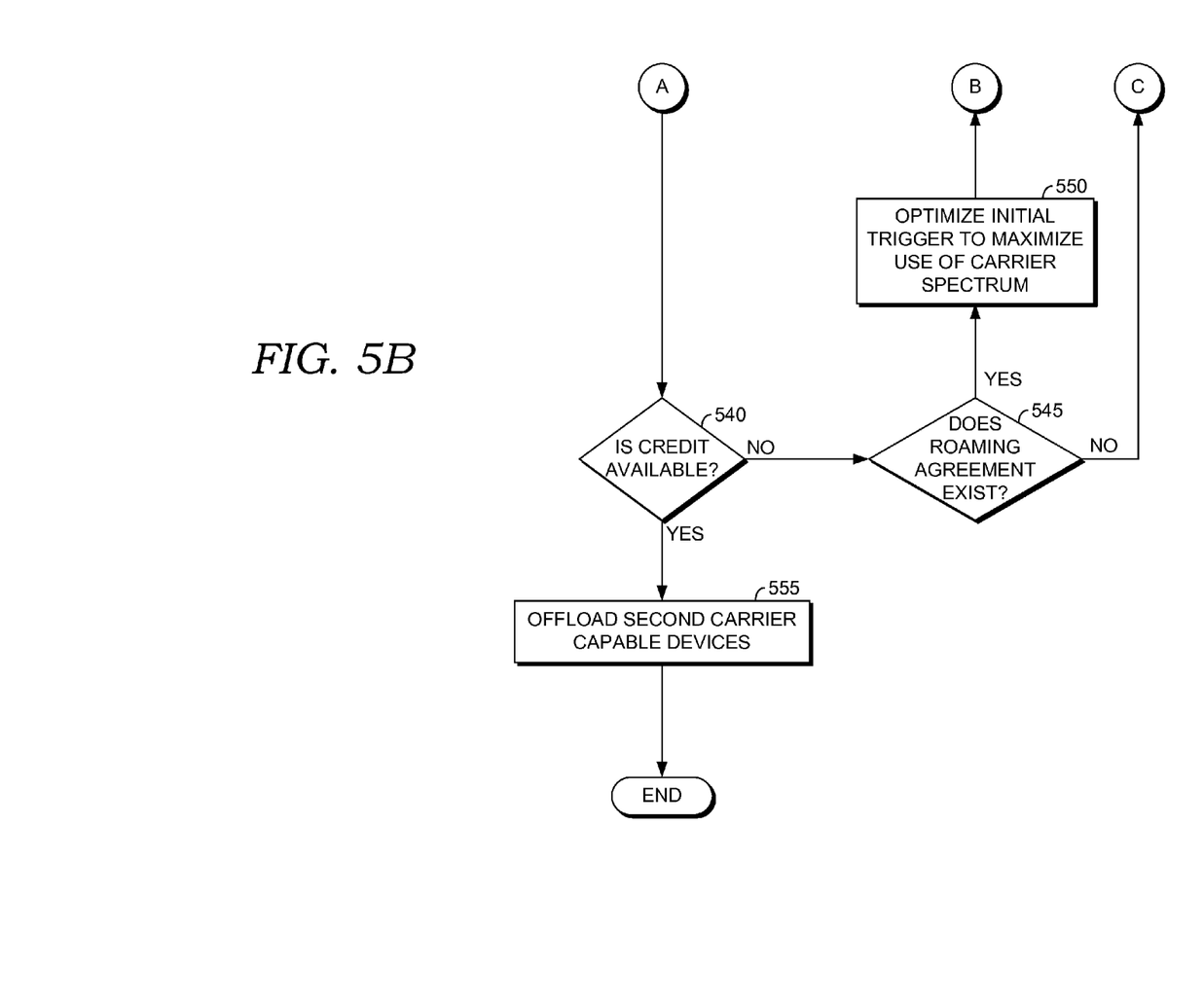

FIG. 5 is a flowchart which illustrates a computer-implemented method of load balancing between multiple carriers in a communications network using multiple load balancing factors. In an embodiment of the invention, the communications network is a telecommunications network operating under a partnership agreement between multiple carriers. The flowchart illustrates just one secondary carrier for purposes of simplicity. However, embodiments of the invention contemplate more than one secondary carrier, wherein each secondary carrier operates under one or more bandwidth levels.

At step 510, the bandwidth capability for one or more user devices, such as the mobile devices 12 discussed above, which operate under the bandwidth of a first carrier is obtained. The one or more devices may have the capability to operate within one or more bandwidths of other carriers, in addition to being capable of operating within the first carrier bandwidth. Step 510 can be implemented by obtaining the parameters of the user device's session tag. At step 515, it is determined whether each user device supports a frequency bandwidth of a second carrier. In an embodiment, multiple secondary carriers may be part of the partnership agreement. For multiple secondary carriers, it is determined which of the user devices can support one or more frequency bandwidths of any other partner carriers. If a user device does not support the frequency bandwidth of the second carrier, then no load balancing occurs, as illustrated at step 520, where the process ends. If a user device does support the frequency bandwidth of the second carrier in step 515, then initial load balancing triggers are established by which the first carrier network traffic is offloaded to the second carrier network in step 525. Those triggers may include, but are not limited to the amount of network usage, the number of users, or a quality of service criterion. This step may be based upon the call model of the one or more devices, such as the device capability, or the network traffic patterns.

At step 530, it is determined whether the initial load balancing triggers in step 525 have been met. If the initial load balancing triggers have not been met, then the thresholds of the load balancing triggers are reduced on the BTS by a certain percentage of offloading in step 535. The initial load balancing thresholds may be reduced by a RAN of the telecommunications network, in an embodiment of the invention. Another embodiment of the invention uses an eNode B type of RAN for reducing the load balancing thresholds. The process returns to step 525 where new initial threshold triggers are established.

If the initial load balancing triggers have been met in step 530, it is determined whether any vendor credits are available from other partner carriers within the partnership in step 540. In embodiments of the invention, a partnership agreement between two or more carriers is made, such as an agreement between n carriers, where n is a positive integer. If the first carrier does not use all of its bandwidth usage allotted to it by the second or $n^{th}$ carrier, then a vendor credit results with the second or $n^{th}$ carrier. The terms of sharing carrier bandwidth are established in the partnership agreement, such as the amount of bandwidth allotment between carriers, or in the absence of vendor credits, the roaming charges that might apply. In embodiments of the invention, the RAN monitors the availability of vendor credits, so that they may be used before they expire. In other embodiments of the invention, an eNode B monitors the availability of vendor credits. The availability of vendor credits is used, in part, to obtain load balancing between the carriers within a partnership. When excess traffic needs to be offloaded from the first carrier to another carrier, then any available vendor credits from the other carrier will be used.

If no vendor credits are available in step 540, then it is determined whether a roaming agreement exists in step 545. If there is no roaming agreement, then no load balancing occurs, and the process returns to step 520 and subsequently ends. If there is a roaming agreement in place in step 545, then the initial load balancing triggers are optimized to maximize use of the first carrier bandwidth in step 550. The process returns to step 525, where new initial threshold triggers are established.

If it is determined in step 540 that vendor credits are available, then the user devices that are capable of operating under the frequency bandwidth of the second carrier are offloaded onto the second carrier network in step 555. One or more computer-readable media, that when executed by a computing device, perform the above-described method of load balancing between multiple carriers in a communications network using multiple load balancing factors is also contemplated by embodiments of the invention.

Many different arrangements of the various components depicted, as well as components not shown, are possible without departing from the spirit and scope of the several embodiments of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media with computer-readable instructions embodied thereon, that when executed by a computing device, perform a method of managing vendor credits in a communications network, the method comprising:
   offloading communication traffic of a first carrier to a second carrier;
   issuing a vendor credit for the first carrier to the second carrier, wherein the vendor credit for the first carrier is based on network bandwidth consumed by the offloaded communication traffic;
   and
   managing the vendor credit to allow the second carrier to load balance communication traffic associated with the second carrier by offloading one or more mobile devices of the second carrier to the first carrier, wherein the one or more mobile devices are configured to operate under the frequency bandwidth of the first carrier and the second carrier.

2. The one or more computer-readable storage media of claim 1, further comprising attaching an expiration time period to the vendor credit.

3. The one or more computer-readable storage media of claim 1, wherein offloading to the second carrier occurs after the first carrier reaches a load threshold.

4. The one or more computer-readable storage media of claim 3, wherein the load threshold comprises at least one of amount of usage, a number of users, or a quality of service criterion associated with the communication traffic.

5. The one or more computer-readable storage media of claim 3, further comprising: modifying the load threshold if the threshold is not met.

6. The one or more computer-readable storage media of claim 1, wherein a surcharge may be applied to offloaded traffic when vendor credits are unavailable.

7. A computer-implemented method of managing vendor credits in a network using a computing system having memory, processor, and data storage components, the computer-implemented method comprising:
   issuing a vendor credit for a first carrier to a second carrier, wherein the vendor credit for the first carrier is based on a difference between agreed thresholds of network bandwidth sharing between the first and second carriers and network bandwidth consumed by offloaded communication traffic to a network of the second carrier; and
   managing the vendor credit to allow the second carrier to load balance communication traffic associated with the second carrier before an expiration date assigned to the vendor credit.

8. The method of claim 7, wherein the vendor credit is issued after second carrier accumulates unused network bandwidth on the first carrier.

9. The method of claim 7, wherein the vendor credit is issued after the first carrier offloads communication traffic to the second carrier.

10. The method of claim 9, wherein offloading to the second carrier occurs after the first carrier reaches a load threshold.

11. The method of claim 10, wherein the load threshold comprises at least one of amount of usage, a number of users, or a quality of service criterion associated with the communication traffic.

12. The method of claim 10, further comprising: modifying the load threshold if the threshold is not met.

13. The method of claim 7, wherein a surcharge may be applied to offloaded traffic.

14. The method of claim 13, wherein traffic is offloaded by moving one or more devices from the first carrier to the second carrier when a vendor credit from the second carrier to the first carrier is available.

15. A base station configured to manage vendor credits, the base station executes a computer-implemented method comprising:
   issuing a vendor credit for a first carrier to a second carrier, wherein the vendor credit for the first carrier is based on network bandwidth consumed by communication traffic of the first carrier offloaded to a network of the second carrier;
   attaching an expiration time period to the vendor credit; and
   managing the vendor credit to allow the second carrier to load balance communication traffic associated with the second carrier before the expiration time of the vendor credit.

16. The base station of claim 15, wherein the vendor credit is issued after second carrier accumulates unused network bandwidth on the first carrier.

17. The base station of claim 15, wherein the vendor credit is issued after the first carrier offloads communication traffic to the second carrier.

18. The base station of claim 16, wherein offloading to the second carrier occurs after the first carrier reaches a load threshold.

* * * * *